United States Patent
Shimizu et al.

(10) Patent No.: US 8,260,200 B2
(45) Date of Patent: Sep. 4, 2012

(54) NON-CONTACT WIRELESS COMMUNICATION APPARATUS, METHOD OF ADJUSTING RESONANCE FREQUENCY OF NON-CONTACT WIRELESS COMMUNICATION ANTENNA, AND MOBILE TERMINAL APPARATUS

(75) Inventors: Kanjiro Shimizu, Chiba (JP); Toshiyuki Takahashi, Tokyo (JP)

(73) Assignee: Sony Mobile Communications Japan, Inc., Tokyo (JP)

( * ) Notice: Subject to any disclaimer, the term of this patent is extended or adjusted under 35 U.S.C. 154(b) by 807 days.

(21) Appl. No.: 12/271,272

(22) Filed: Nov. 14, 2008

(65) Prior Publication Data

US 2009/0146892 A1 Jun. 11, 2009

(30) Foreign Application Priority Data

Dec. 7, 2007 (JP) ................. 2007-316548

(51) Int. Cl.
*H04B 5/00* (2006.01)
(52) U.S. Cl. ... 455/41.1; 455/77; 455/193.1; 455/197.2; 320/108; 320/115; 320/150; 235/435; 340/10.1; 340/572.1
(58) Field of Classification Search ............... 455/41.1, 455/77, 193.1, 197.2; 320/108, 115, 150; 235/435; 340/10.1
See application file for complete search history.

(56) References Cited

U.S. PATENT DOCUMENTS

| 7,948,208 | B2* | 5/2011 | Partovi et al. | 320/108 |
| 7,952,322 | B2* | 5/2011 | Partovi et al. | 320/108 |
| 2004/0065733 | A1* | 4/2004 | Fukuoka | 235/435 |
| 2006/0267771 | A1* | 11/2006 | Shionoiri et al. | 340/572.1 |
| 2007/0182367 | A1* | 8/2007 | Partovi | 320/108 |
| 2007/0279002 | A1* | 12/2007 | Partovi | 320/115 |

FOREIGN PATENT DOCUMENTS

| CN | 1484187 A | 3/2004 |
| CN | 1881795 A | 12/2006 |
| EP | 1 022 677 A1 | 7/2000 |
| JP | 2006-237782 | 9/2006 |

OTHER PUBLICATIONS

Office Action issued Oct. 25, 2011, in Chinese Patent Application No. 200810181715.6 with English translation.

* cited by examiner

*Primary Examiner* — April G Gonzales
(74) *Attorney, Agent, or Firm* — Oblon, Spivak, McClelland, Maier & Neustadt, L.L.P.

(57) ABSTRACT

A non-contact wireless communication apparatus and a mobile terminal apparatus are provided. The non-contact wireless communication apparatus includes a non-contact wireless communication antenna, a resonance capacitor, connected in parallel with the non-contact wireless communication antenna, for obtaining a predetermined resonance frequency with the non-contact wireless communication antenna, a resonance frequency adjustment unit for changing a resonance capacitance of the resonance capacitor to adjust the resonance frequency, a capacitance change amount control unit for controlling a change in resonance capacitance of the resonance capacitor in the resonance frequency adjustment unit, a resonance frequency shift unit for shifting the resonance frequency of the non-contact wireless communication antenna, and on/off control unit for performing on/off control of the resonance frequency shift unit in accordance with the amount of change in resonance capacitance of the resonance capacitor by the capacitance variation control unit.

15 Claims, 14 Drawing Sheets

FIG. 12

| SET VALUE OF ADJUSTMENT CIRCUIT | RESONANCE FREQUENCY SHIFT CIRCUIT |
|---|---|
| 0 0 0 | OFF |
| 0 0 1 | |
| 0 1 0 | |
| 0 1 1 | |
| 1 0 0 | ON |
| 1 0 1 | |
| 1 1 0 | |
| 1 1 1 | |

WHEN MSB (THIRD BIT) IS AT HIGH LEVEL,
RESONANCE FREQUENCY SHIFT CIRCUIT IS TURNED ON

NON-CONTACT WIRELESS COMMUNICATION APPARATUS, METHOD OF ADJUSTING RESONANCE FREQUENCY OF NON-CONTACT WIRELESS COMMUNICATION ANTENNA, AND MOBILE TERMINAL APPARATUS

CROSS-REFERENCE TO RELATED APPLICATIONS

The present application claims benefit of priority of Japanese patent Application No. 2007-316548 filed in the Japanese Patent Office on Dec. 7, 2007, the entire disclosure of which is incorporated herein by reference.

BACKGROUND OF THE INVENTION

1. Field of the Invention

The present invention relates to a non-contact wireless communication apparatus suitable for mobile devices, such as a mobile phone, a PHS telephone (Personal Handyphone System), a PDA apparatus (Personal Digital Assistant), a handheld game machine, and a notebook-type personal computer apparatus, etc., a method of adjusting a resonance frequency of a non-contact wireless communication antenna, and a mobile terminal apparatus.

2. Description of Related Art

Japanese Unexamined Patent Application Publication No. 2006-237782 (page 4: FIGS. 1 and 2) hereinafter referred to as Patent Document 1, discloses a mobile information terminal having a non-contact communication unit which is capable of being provided in a small space, and allows substantially the same communication distance as the case where it is provided either in the front of the device or in the back of the device.

In this mobile information terminal, an antenna of a non-contact communication unit which receives a power supply from an external device by inductive coupling in a non-contact manner, to transmit/receive a signal with the external device is arranged such that a wire material is wound around a plate-like or rod-like core material and this antenna part is provided in the thickness direction near an end face of the mobile information terminal. Thus, the mobile information terminal may obtain substantially the same communication distance on both sides of the mobile information terminal with a small occupied space.

SUMMARY OF THE INVENTION

However, in the mobile information terminal disclosed in the Patent Document 1 as well as in the mobile device, there arises an issue that a variation in the precision of component assembly for each device at the time of production, a variation in characteristic of each of electric and electronic components which constitute the antenna of the non-contact communication unit, etc. may cause a variation in a resonance frequency of the antenna. As shown in FIG. 14, even within a service available area in compliance with the standard, if the variation in this resonance frequency arises, then a service unavailable area may arise where non-contact wireless communications are not available, which is not preferred.

As shown in FIG. 14, it may theoretically be possible to prevent the service unavailable area from arising by setting up (managing) the resonance frequency within a narrow range. However, it is in fact difficult to manage resonance frequency within such a narrow range and to manufacture the mobile device, because of the variation in the precision of component assembly, the variation in the characteristic of each of the electric and electronic components, etc.

Accordingly, it is desirable to provide a non-contact wireless communication apparatus, a method of adjusting the resonance frequency of the non-contact wireless communication antenna, and the mobile terminal apparatus, in which the variation in the precision of component assembly, the variation in the characteristic of each of the electric and electronic components, etc., are absorbed and the resonance frequency of the antenna of the non-contact communication unit is simply adjusted to a predetermined resonance frequency, to thereby prevent the occurrence of service unavailable area and easily manufacture the device.

In accordance with one aspect of the present invention, there is provided a non-contact wireless communication apparatus which receives a power supply from an external device by inductive coupling in a non-contact manner, to transmit/receive signals with the external device. The non-contact wireless communication apparatus includes a non-contact wireless communication antenna, a resonance capacitor, a resonance frequency adjustment unit, a capacitance change control unit, a resonance frequency shift unit, an on/off control unit. The resonance capacitor is connected in parallel with the non-contact wireless communication antenna and obtains a predetermined resonance frequency with the non-contact wireless communication antenna. The resonance frequency adjustment unit changes a resonance capacitance of the resonance capacitor to adjust the resonance frequency. The capacitance change control unit controls an amount of change in resonance capacitance of the resonance capacitor in the resonance frequency adjustment unit. The resonance frequency unit shifts the resonance frequency of the non-contact wireless communication antenna. The on/off control unit performs on/off control of the resonance frequency shift unit in accordance with the amount of change in the resonance capacitance of the resonance capacitor by the capacitance variation control unit.

In accordance with another aspect of the present invention, there is provided a method of adjusting the resonance frequency of the non-contact wireless communication antenna in a non-contact wireless communication apparatus which receives a power supply from an external device by inductive coupling in a non-contact manner, to transmit/receive a signal with the external device. The method includes the steps of: adjusting, by a resonance frequency adjustment unit, the resonance frequency by changing a resonance capacitance of a resonance capacitor connected in parallel with a non-contact wireless communication antenna and for obtaining a predetermined resonance frequency with the non-contact wireless communication antenna, and on/off controlling, by an on/off control unit, a resonance frequency shift unit in accordance with an amount of change in the resonance capacitance of the resonance capacitor.

In accordance with a further aspect of the present invention, there is provided a mobile terminal apparatus including non-contact wireless communication unit which receives a power supply from an external device by inductive coupling in a non-contact manner, to transmit/receive a signal with the external device. The non-contact wireless communication unit includes a non-contact wireless communication antenna, a resonance capacitor, a resonance frequency adjustment unit, a capacitance change control unit, a resonance frequency shift unit, an on/off control unit. The resonance capacitor is connected in parallel with the non-contact wireless communication antenna and obtains a predetermined resonance frequency with the non-contact wireless communication antenna. The resonance frequency adjustment unit changes a resonance capacitance of the resonance capacitor to adjust the resonance frequency. The capacitance change control unit controls an amount of change in resonance capacitance of the resonance capacitor in the resonance frequency adjustment unit. The resonance frequency unit shifts the resonance frequency of the non-contact wireless communication antenna. The on/off control unit performs on/off control of the resonance frequency shift unit in accordance with the amount of change in the resonance capacitance of the resonance capacitor by the capacitance variation control unit.

In embodiments of the present invention, the resonance frequency adjustment unit changes the resonance capacitance of the resonance capacitor connected to the non-contact wireless communication antenna and adjusts the resonance frequency of the non-contact wireless communication antenna to a desired resonance frequency, the on/off control unit performs on/off control of the resonance frequency shift unit which shifts the resonance frequency of the non-contact wireless communication antenna in accordance with the amount of change in the resonance capacitance of the resonance capacitor, so that a management range of the resonance frequency can be extended and the adjustment of the resonance frequency can easily be carried out, as well as good communication characteristics can be obtained.

According to embodiments of the present invention, even when the variation in the component assembly precision, the variation in characteristics of each of the electric and electronic components, etc. take place, such variations can be absorbed and the resonance frequency of the non-contact wireless communication antenna can be easily adjusted to the predetermined resonance frequency. Thus, the variation in resonance frequency can be avoided and it is possible to prevent the occurrence of service unavailable area. Furthermore, since the resonance frequency can be adjusted simply, the manufacture of the device can be facilitated.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

FIG. 12 is a table for explaining on/off control of the resonance frequency shift circuit of the non-contact wireless communication unit provided for the mobile phone in accordance with the third embodiment.

DETAILED DESCRIPTION OF EMBODIMENTS

The present invention may be applied to a mobile phone provided with a non-contact wireless communication unit.

First Embodiment

Structure of Mobile Phone

Figure 1:
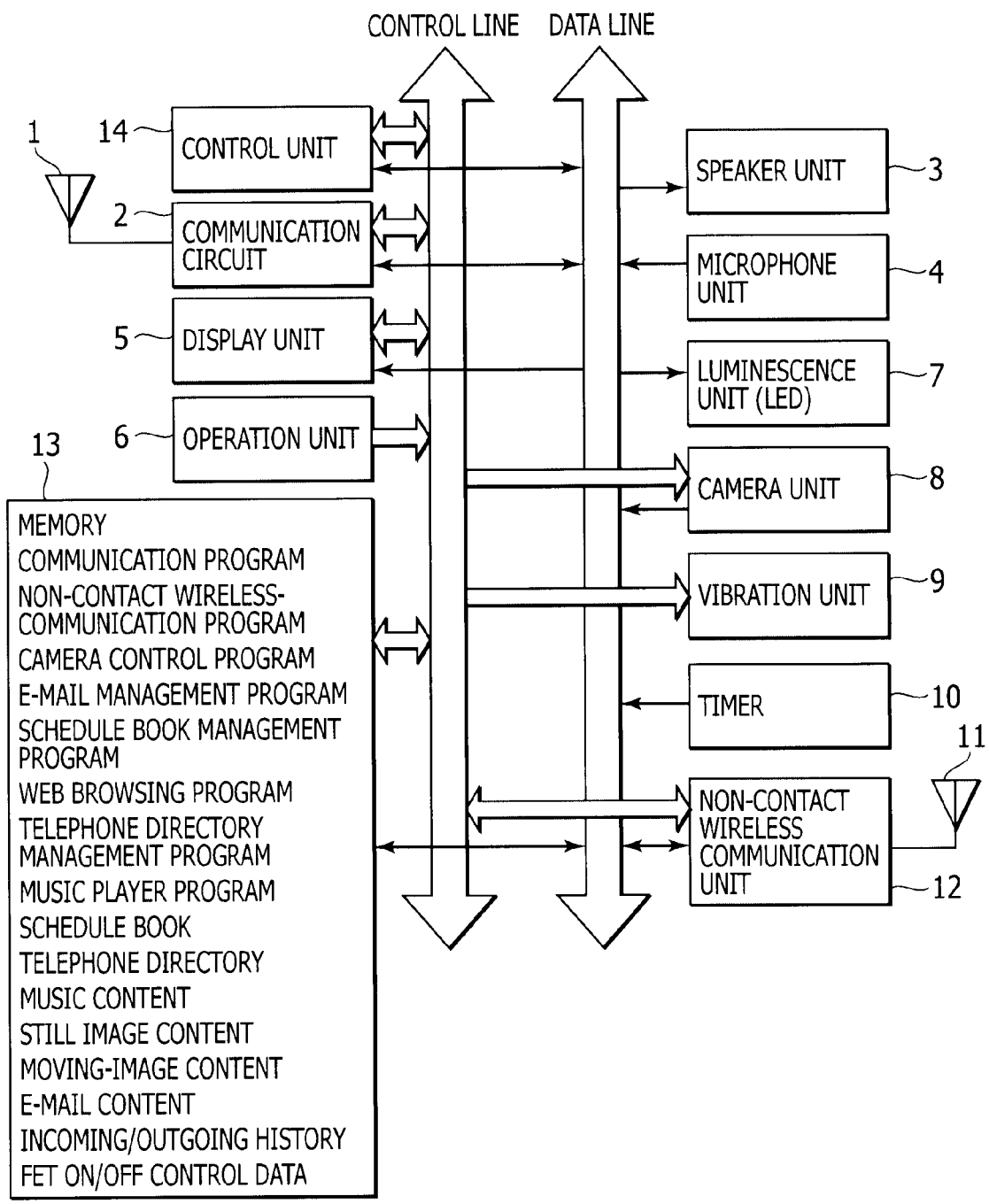
FIG. 1 is a block diagram of a mobile phone in accordance with a first embodiment to which the present invention is applied.

The mobile phone according to a first embodiment of the present invention includes, as shown FIG. 1, an antenna 1, a communication circuit 2, a speaker unit 3, a microphone unit 4, a display unit 5, an operation unit 6, a luminescence unit 7 (LED: Light Emitting Diode), a camera unit 8, a vibration unit 9, and a timer 10. The communication circuit 2 performs wireless communications with a base station. The speaker unit 3 obtains output of sounds, such as a ringer tone and a reception sound. The microphone unit 4 collects a transmission sound. The display unit 5 displays images (video image, still image, etc.), a character, etc. The operation unit 6 performs input operation of a character etc., selection operation of a desired menu, etc. The luminescence unit 7 notifies an incoming/outgoing call, etc. with light. The camera unit 8 captures a still image or a video image of a desired photographic subject. The vibration unit 9 vibrates a casing of the mobile phone to notify a user of the incoming/outgoing call etc. The timer 10 counts the current time.

Still further, this mobile phone includes a non-contact communication antenna 11, a non-contact wireless communication unit 12, a memory 13, and a control unit 14. The non-contact wireless communication unit 12 transmits/receives signals with an external device, such as a reader/writer, by inductive coupling in a non-contact manner. The memory 13 stores a communication processing program (communication program) for performing wireless-communication processing through the base station, a non-contact wireless-communication program for executing non-contact wireless-communication control in the non-contact wireless communication unit 12, as well as various application programs, various data (content) used by each of these application programs, etc. The control unit 14 controls the whole mobile phone.

As the non-contact communication antenna 11, one dual purpose antenna serving both transmitting and receiving or a two-antenna structure having a sub tuned antenna for frequency adjustment may be used. Further, antennas of, such as a loop type, a two-antenna loop-type, a ferrite type, etc., may be used, for example.

The memory 13 stores a camera control program for capture control of the camera unit 8 and having a viewer function for a video image and a still image captured by the camera unit 8 or taken in through a network or an input terminal, an e-mail management program for controlling creation and communication of e-mail, a schedule book control program for managing a schedule book with which a user's schedule is registered, a web browsing program for looking through websites over a predetermined network, such as the Internet, etc., a telephone directory control program for managing a telephone directory, and a music player program for reproducing a music content.

The memory 13 stores further the schedule book in which a desired schedule of the user is registered, the telephone directory in which still images of such as a user's acquaintance and friend, a telephone number, an e-mail address, and a birth date, etc. are registered, the music content to be reproduced on the basis of the music player program, a still image content and a video content to be reproduced on the basis of the viewer function of the camera control program, a transmitted and received e-mail content, incoming/outgoing histories of telephone calls and e-mails, and the like.

[Configuration of Non-Contact Wireless Communication Unit]

Figure 2:
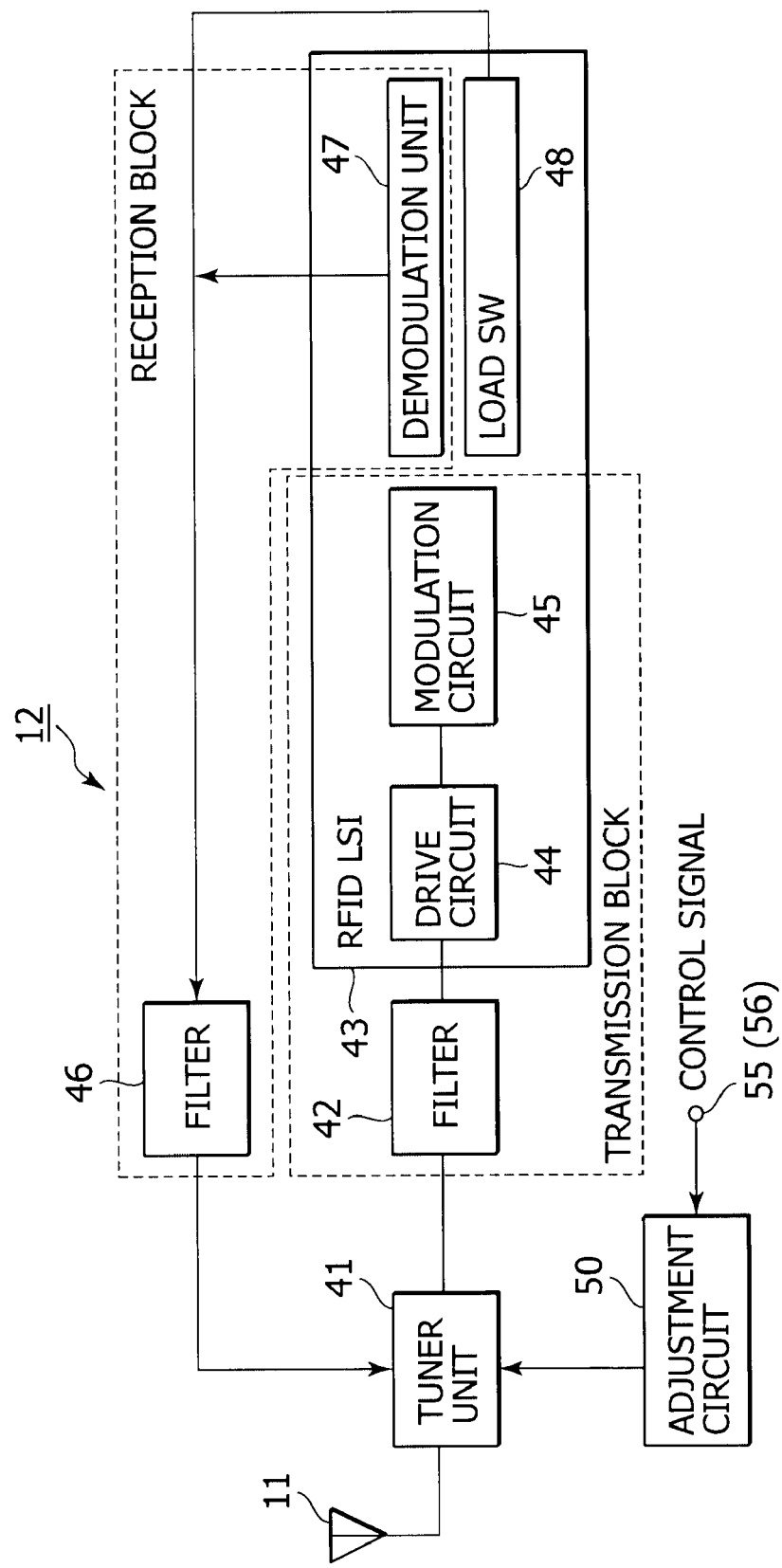
FIG. 2 is a block diagram of a non-contact wireless communication unit provided for the mobile phone of the first embodiment.

FIG. 2 shows a block diagram of the non-contact wireless communication unit 12. The non-contact wireless communication unit 12 functions as a reader/writer corresponding to non-contact wireless communications, and as an RFID card (RFID: radio Frequency Identification). More specifically, in the case of functioning as a transmission block of the reader/writer, the non-contact wireless communication unit 12 includes the non-contact wireless communication antenna 11, a tuner unit 41, a filter 42, and an RFID LSI 43. In this case, the RFID LSI 43 includes a drive circuit 44 and a modulation circuit 45 as well as an MPU system which provides a higher layer of a wireless communication protocol, a nonvolatile memory, etc. Each circuit may be constituted by discrete circuits without integrating into LSI.

Further, in the case of functioning as a reception block of the reader/writer and the RFID card, the non-contact wireless communication unit 12 includes the non-contact wireless communication antenna 11, the tuner unit 41, a filter 46, and the RFID LSI 43. In this case, the RFID LSI 43 includes an amplifier for amplifying the response data subjected to ASK modulation (ASK: Amplitude Shift Keying), a filter for waveform shaping, a demodulation unit 47 for obtaining data, a circuit for extracting a clock signal of a subcarrier received from the reader/writer, etc.

Further, in case that when the non-contact wireless communication unit 12 functions as the RFID card, when the non-contact wireless communication returns the response to the reader/writer side, it carries out the modulation by repeating ON/OFF of a load in a load SW unit 48. As a result of this, the modulated waveform can be seen as an impedance change at the antenna on the reader/writer side, and the modulated waveform is transmitted as an amplitude difference in voltage.

Together with an inductance component of the non-contact wireless communication antenna 11, the tuner unit 41 constitutes a capacitor with a predetermined capacitance for obtaining a resonance frequency of, for example, 13.56 MHz for non-contact wireless communications. The tuner unit 41 includes an adjustment circuit 50 for adjusting the resonance frequency by changing the capacitance of the capacitor.

(Configuration of Tuner Unit and Adjustment Circuit)

Figure 3:
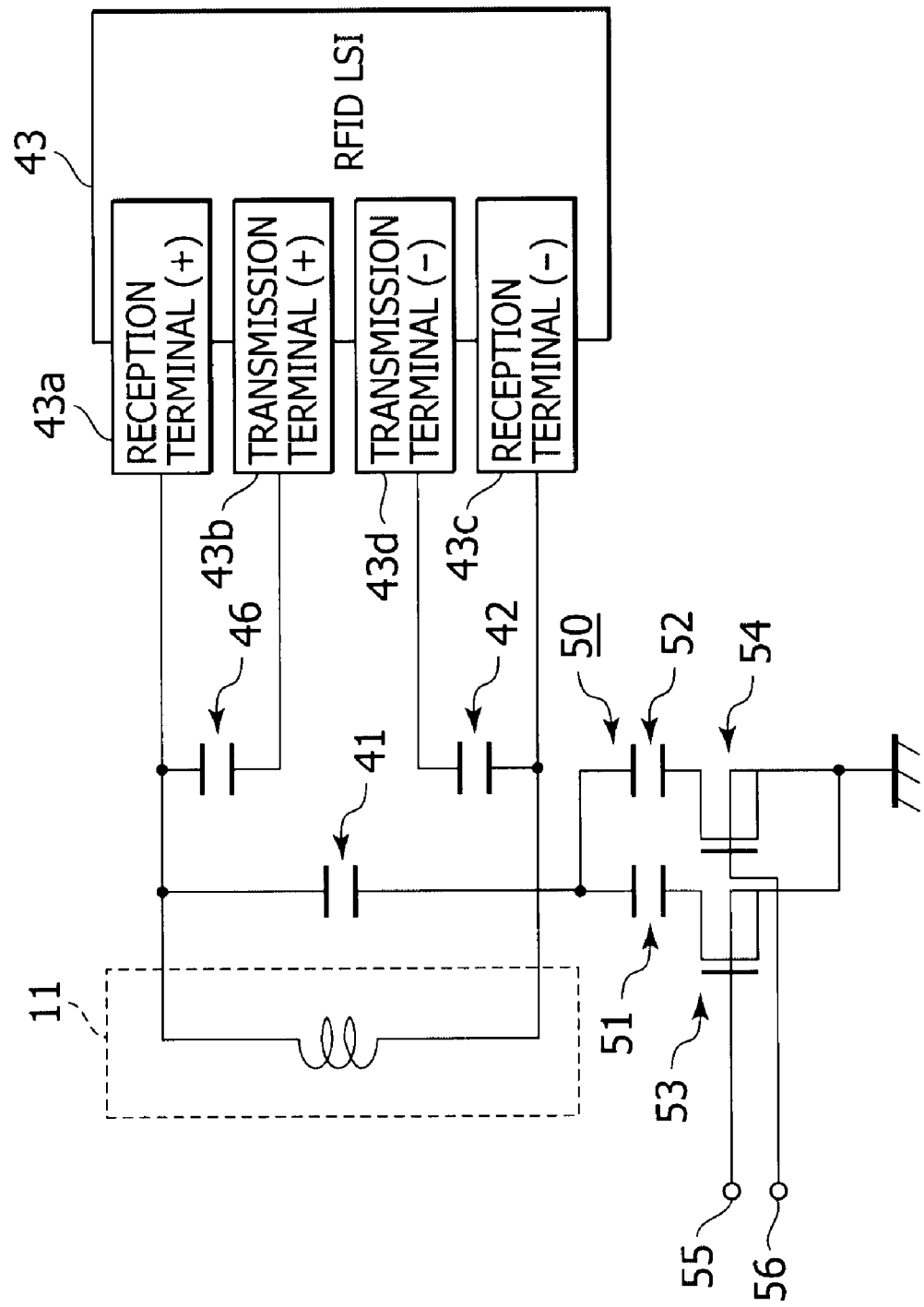
FIG. 3 is a circuit diagram of a tuner unit and an adjustment circuit which are provided for the non-contact wireless communication unit of the mobile phone in the first embodiment.

FIG. 3 shows a circuit diagram of the tuner unit 41 and the adjustment circuit 50. As shown in FIG. 3, the tuner unit 41 constitutes a capacitor connected in parallel with the non-contact wireless communication antenna 11. Further, the adjustment circuit 50 includes the first and second capacitors 51 and 52 and the first and second FETs 53 and 54 (Field Effect Transistor: field effect transistor).

More specifically, an anode side of the non-contact wireless communication antenna 11 is connected to a reception terminal 43a on an anode side of the RFID LSI 43 and also connected to a transmission terminal 43b on the anode side of the RFID LSI 43 through the filter 46 which is a capacitor for eliminating a direct-current component. Further, a cathode side of the non-contact wireless communication antenna 11 is connected to a reception terminal 43c on a cathode side of the RFID LSI 43 and also connected to a transmission terminal 43d on the cathode side of the RFID LSI 43 through the filter 42 which is a capacitor for removing a direct-current component.

The capacitor (hereinafter referred to as "resonance capacitor 41") which is the tuner unit 41, is connected in parallel with the non-contact wireless communication antenna 11. One end of each of the first and second capacitors 51 and 52 of the adjustment circuit 50 is connected in series with this capacitor. The other end of the first capacitor 51 is connected to a source of the first FET 53, and a drain of this first FET 53 is grounded. Further, the other end of the second capacitor 52 is connected to a source of the second FET 54, and a drain of this second FET 54 is grounded.

At the time of shipment of the mobile phone (or possibly at the time of manufacturing or repairing), gates of the first and second FETs 53 and 54 are configured to be supplied with a control signal through terminals 55 and 56 from the control unit 14 as shown in FIG. 1. Each of the FETs 53 and 54 is subjected to ON/OFF control with this control signal, so that the resonance capacitance of the resonance capacitor 41 is changed and the resonance frequency of the non-contact wireless communication antenna 11 is adjusted.

In addition, as an example, a capacitance ratio between the first and second capacitors 51 and 52 is a capacitance ratio of "1:2" so that the resonance capacitance of the resonance capacitor 41 may be changed linearly at the time of adjusting the resonance frequency.

[Adjustment Operation of Resonance Frequency]

Next, the adjustment operation of the resonance frequency of the non-contact wireless communication antenna 11 will be described. The resonance frequency is adjusted in a situation where the mobile phone is assembled at the time of shipment, at the time of manufacturing, at the time of repairing etc, of the mobile phone according to the present embodiment. An engineer who performs the adjustment supplies the control signals of "00", "10", "01", and "11" (=control signals of four patterns of "0" to "3") from the control unit 14 as shown in FIG. 1 to each of the FET 53 and 54 one by one via the terminals 55 and 56 as shown in FIG. 3. Thus, in accordance with the control signals, each of the FETs 53 and 54 is performed ON/OFF control, and the resonance frequency of the non-contact wireless communication antenna 11 is changed.

In other words, when both of the FETs 53 and 54 are controlled to be turned off by supplying the control signal of "00" to the respective gates of the FETs 53 and 54, the capacitors 51 and 52 are grounded through parasitic capacitances of the FETs 53 and 54, respectively. In this case, it seems that the comparatively small amount of parasitic capacitance is inserted in parallel to inductance (L) of the non-contact wireless communication antenna 11.

On the other hand, when both of the FETs 53 and 54 are controlled to be turned on by supplying the control signal of "11" to the respective gates of the FETs 53 and 54, the capacitors 51 and 52 are grounded through the FETs 53 and 54, respectively. In this case, a sum of the capacitances of the capacitors 51 and 52 is inserted in parallel to the inductance (L) of the non-contact wireless communication antenna 11 as it is, so that the resonance frequency of the non-contact wireless communication antenna 11 shifts greatly toward the lower one, compared with the case where both of the FETs 53 and 54 are controlled to be turned off.

Figure 4:
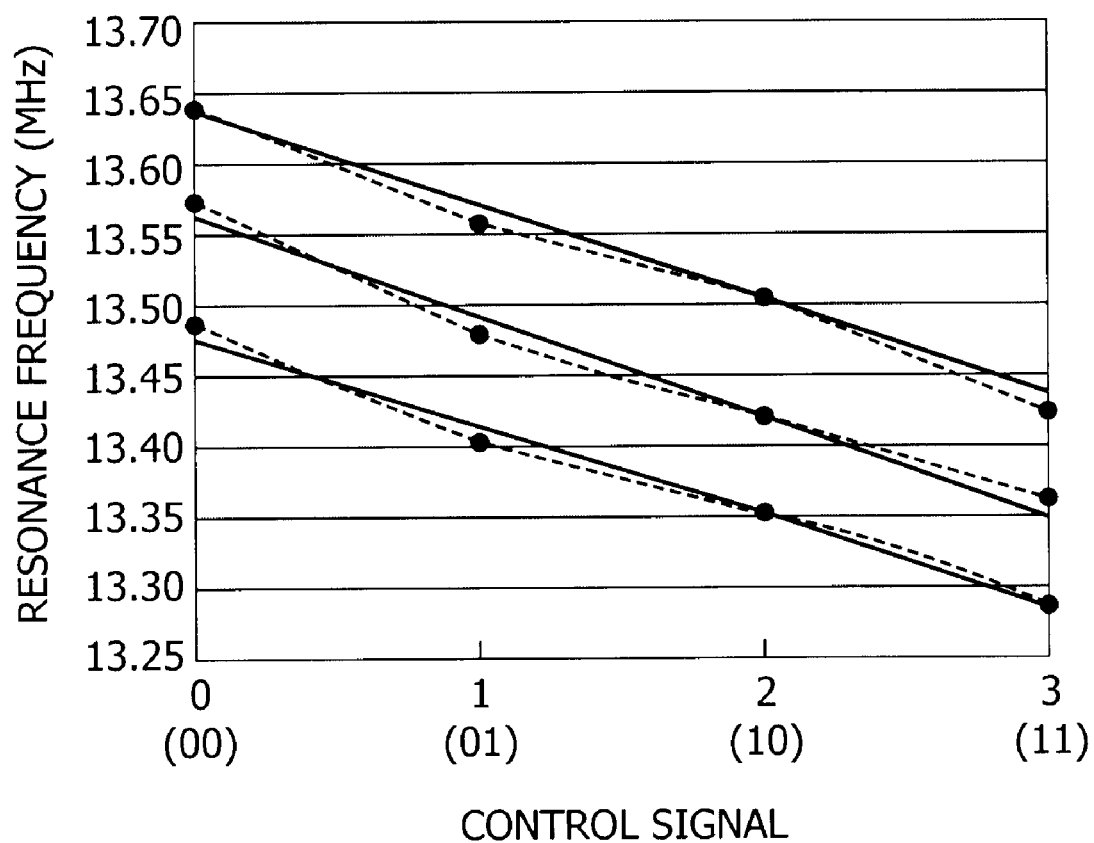
FIG. 4 is a graph showing how a resonance frequency of the non-contact wireless communication antenna is changed linearly by the adjustment circuit provided for the non-contact wireless communication unit of the mobile phone in the first embodiment.

Further, when the control signal of "10" is supplied to the gate of each of the FETs 53 and 54, the first FET 53 is controlled to be turned on and the second FET is controlled to be turned off, and then the capacitance of the second capacitor 52 is inserted in parallel to the inductance (L) of the non-contact wireless communication antenna 11. When the control signal of "01" is supplied to the gate of each of the FETs 53 and 54, the first FET 53 is controlled to be turned off and the second FET 54 is controlled to be turn on, and then the capacitance of the first capacitor 52 is inserted in parallel to the inductance (L) of the non-contact wireless communication antenna 11. As described above, since the capacitance ratio of the first capacitor 51 to the second capacitor 52 is set as "1:2", the control signal supplied to the gate of each of the FETs 53 and 54 is changed between "00" and "11", so that the resonance frequency of the non-contact wireless communication antenna 11 changes linearly as shown in FIG. 4.

The engineer brings the memory 13 shown in FIG. 1 into store any one of the control signals "00" "01", "10", and "11" which has been supplied at the time of obtaining a desired resonance frequency, as FET ON/OFF control data. Hereafter, the control unit 14 fixedly performs ON/OFF control of each of the FETs 53 and 54 on the basis of the FET ON/OFF control data. Thus, the resonance frequency of the non-contact wireless communication antenna 11 is always controlled by the adjusted resonance frequency.

Advantages of First Embodiment

As is clear from the above description, in the mobile phone of this first embodiment, the adjustment circuit 50 changes the resonance capacitance of the resonance capacitor 41 connected in parallel to the non-contact wireless communication antenna 11, thereby electrically adjusting the capacitance of the non-contact wireless communication antenna 11.

More specifically, the adjustment circuit 50 includes the first capacitor 51 and the first FET 53 connected in series between the resonance capacitor 41 and grounding, and the second capacitor 52 and second FET 54 which are similarly connected in series between the resonance capacitor 41 and grounding. The ON/OFF control of each of the FETs 53 and 54 is performed by changing the control signal supplied to the gate of each of the FETs 53 and 54 between "00" and "11", and the capacitance of the first capacitor 51 and/or the capacitance of the second capacitor 52 are added to the capacitance of the resonance capacitor 41, to change the resonance capacitance of the resonance capacitor 41. Then, based on the change of this resonance capacitance, the resonance frequency of the non-contact wireless communication antenna 11 is changed, so that the resonance frequency of the non-contact wireless communication antenna 11 is adjusted to a desired resonance frequency.

Figure 5:
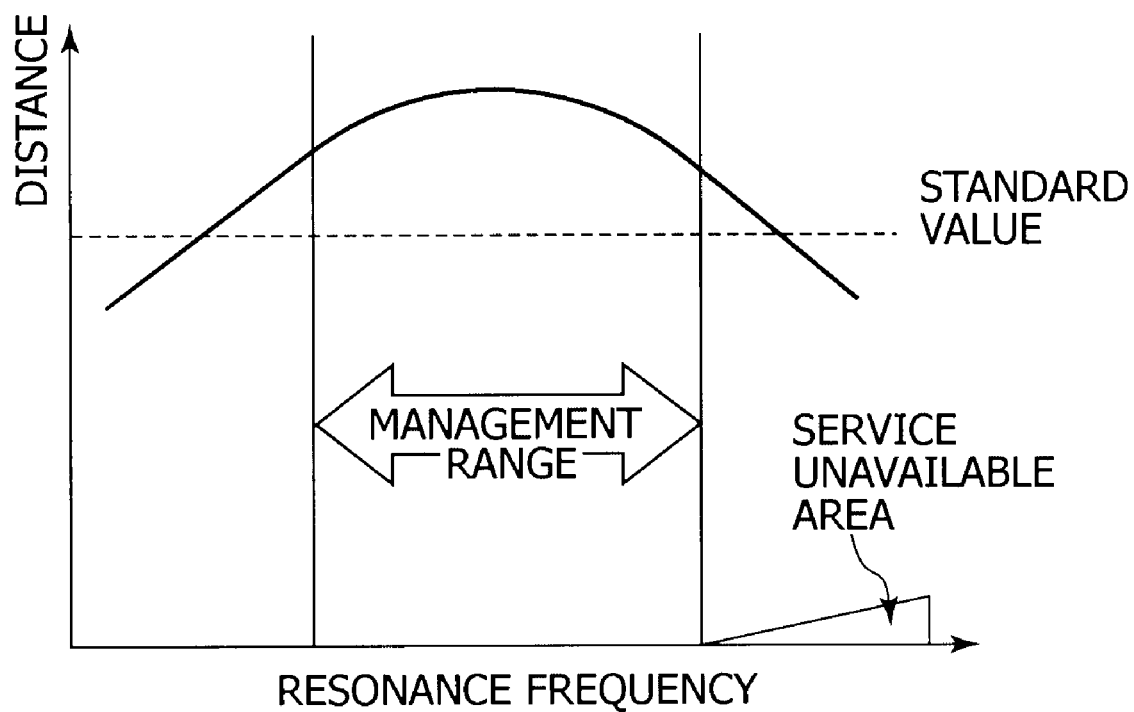
FIG. 5 is a graph showing that a management range of the resonance frequency of the non-contact wireless communication antenna is extended by way of adjustment by the adjustment circuit provided for the non-contact wireless communication unit of the mobile phone in the first embodiment, and that a service unavailable area is removed, and showing a relationship between the resonance frequency of this non-contact wireless communication antenna and a communication distance.

Thus, even in the case where the variation in the precision of component assembly, the variation in characteristic of each of the electric and electronic components, etc. take place, such variations are absorbed and the resonance frequency of the non-contact wireless communication antenna can easily be adjusted to within a predetermined resonance frequency range. Accordingly, since the resonance frequency for each mobile phone is adjusted uniformly and the variation in the resonance frequency for each of the mobile phones can be prevented, it is possible to prevent the occurrence of the service unavailable area as shown in FIG. 5.

Further, even in the case where the variation in the precision of component assembly, the variation in characteristic of each of the electric and electronic components, etc. take place, such variations are absorbed and the resonance frequency of the non-contact wireless communication antenna can easily be adjusted to a predetermined resonance frequency. Accordingly, the variation in the precision of component assembly, and the variation in characteristic of each of the electric and electronic components, etc. can be tolerated. Further, as shown in FIG. 5, a management range, such as variation in the precision of component assembly and the variation in characteristic of each of the electric and electronic components, can be extended, and each mobile phone can easily be manufactured.

Further, when the control signals of "00" through "11" are supplied to each of the FETs 53 and 54 by setting the capacitance ratio of the first capacitor 51 to the second capacitor 52 as "1:2", the capacitance of the non-contact wireless communication antenna 11 can be changed linearly. As a result of this, the resonance frequency of the non-contact wireless communication antenna 11 to be adjusted with the control signals can also be changed linearly, and it is possible to perform the adjustment of the resonance frequency of the non-contact wireless communication antenna 11 more simply and easily (see FIG. 4).

In the explanation of the above-described embodiment, the resonance capacitance of the resonance capacitor 41 is changed by four steps with two capacitors 51 and 52 and two FETs 53 and 54 to adjust the resonance frequency of the non-contact wireless communication antenna 11, it is, however, possible to adjust the resonance frequency of the non-contact wireless communication antenna 11 by changing the resonance capacitance of the resonance capacitor 41 by two steps with one capacitor and one FET. Further, the resonance capacitance of the resonance capacitor 41 may be changed by eight steps with three capacitors and three FETs, to adjust the resonance frequency of the non-contact wireless communication antenna 11. In other words, the numbers of the capacitors and FETs for changing the resonance capacitance of the resonance capacitor 41 can be changed with a design. The more numbers of capacitors and FETs are provided, the finer adjustment of the resonance frequency can be attained.

Second Embodiment

Next, the mobile phone according to a second embodiment of the present invention will be described. When the RFID LSI of a balance-type receiving system is used as the RFID LSI 43, non-contact wireless-communication data are received differentially. Thus, it is preferable that voltages excited at both ends of the non-contact wireless communication antenna 11 are possibly caused to be at the same level in order to improve the non-contact wireless-communication characteristic (S/N).

Figure 6:
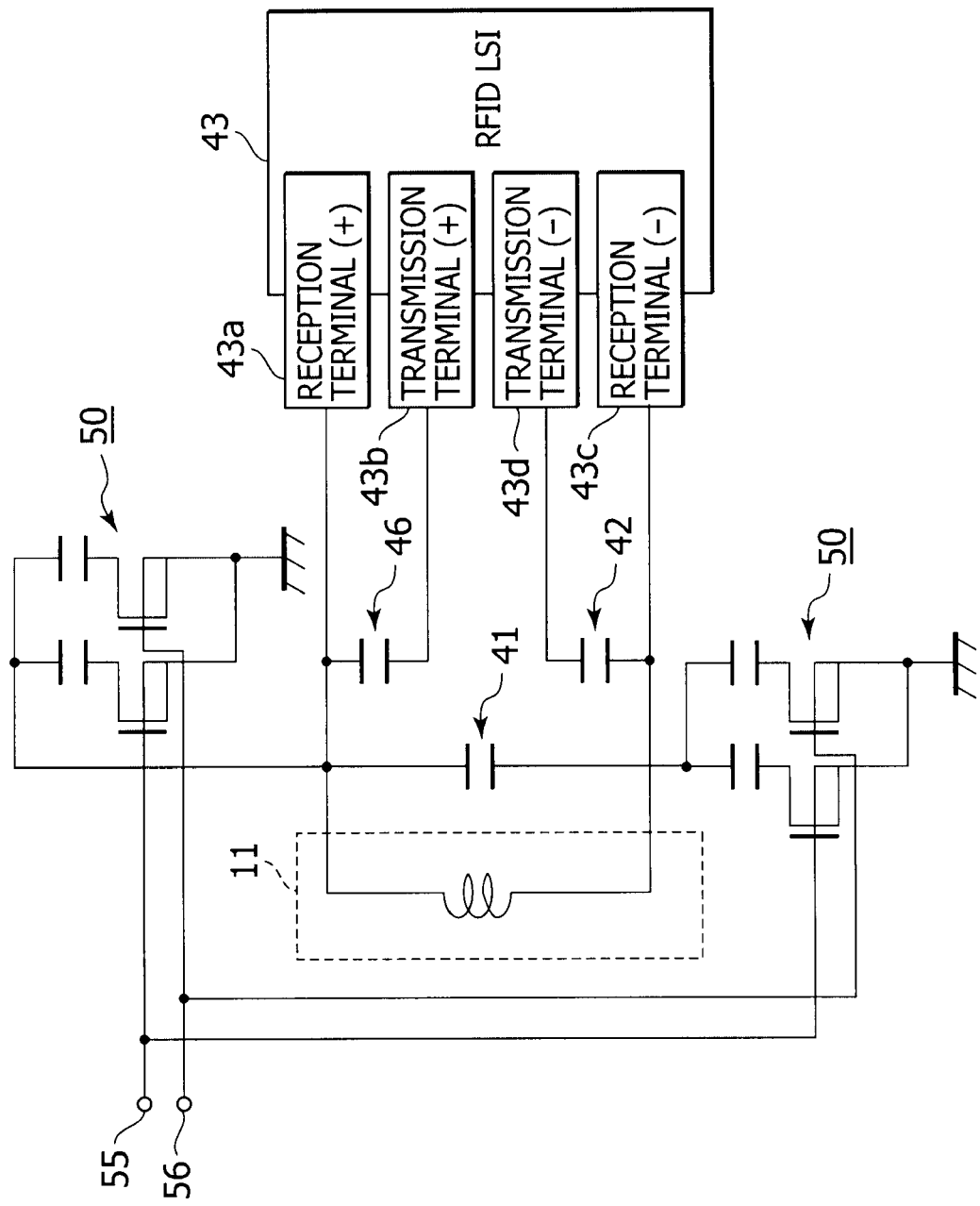
FIG. 6 is a circuit diagram of the non-contact wireless communication unit provided for the mobile phone in accordance with a second embodiment of the present invention.

For this reason, as shown in FIG. 6, the adjustment circuit 50 is connected to both of the cathode side and the anode side of the resonance capacitor 41, whereby the excitation voltages at the non-contact wireless communication antenna 11 can be balanced, and the non-contact wireless-communication characteristic can be improved, and also the same advantage as that of the mobile phone of the first embodiment as described above can be obtained.

Third Embodiment

Next, the mobile phone according to a third embodiment of the present invention will be described. In the mobile phone of the first and second embodiments as described above, although the capacitance value of the resonance capacitor 41 is changed in the adjustment circuit 50 to adjust the resonance frequency, there is a possibility that the characteristic may change with the setting state (state) of the adjustment circuit 50 in these cases. For example, when three adjustment circuits 50 as described above are provided, and these three adjustment circuits 50 are controlled by 3-bit control signals of "000" through "111" by eight states in total, it is assumed that every resonance frequency in each state is adjusted to the same. In this case, since the capacitance value of the resonance capacitor 41 connected to the non-contact wireless communication antenna 11 is different for each state even if it is of the same frequency, a difference occurs in circuit impedance. As a result, the communication characteristic changes, and an available frequency band also changes for each state. In other words, although it is good to manage the resonance frequency, there is a possibility that the communication characteristic is also changed at the same time.

Figure 7:
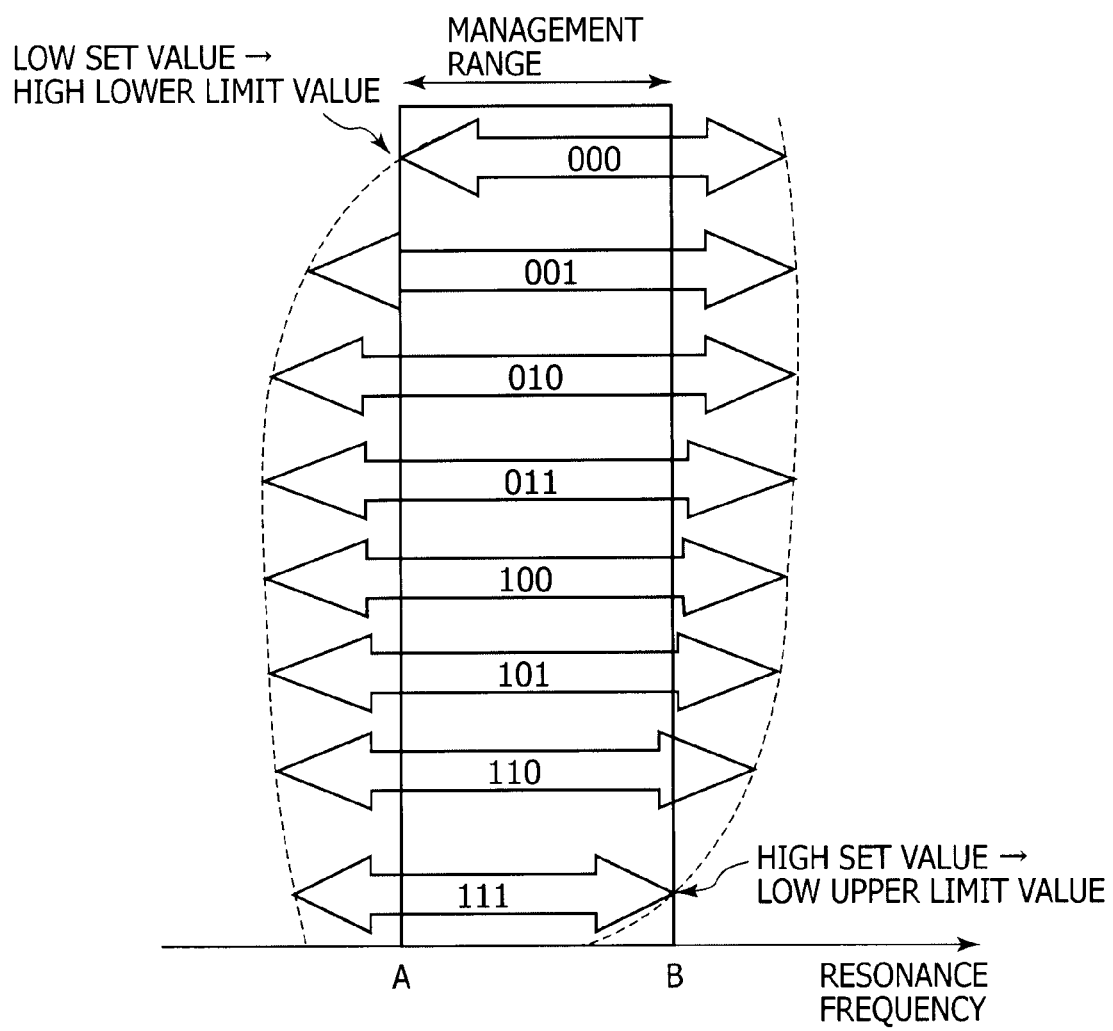
FIG. 7 is a chart showing a management range of the resonance frequency in the case where the resonance frequency is adjusted only with the adjustment circuit provided for the non-contact wireless communication unit.

For this reason, an issued arises in that it is necessary for a designer of the mobile phone to know the frequency characteristics in every state, and to find a frequency band which secures the communication characteristic for every state, which leads to increased evaluation person-hours. Further, as shown in FIG. 7, a frequency bandwidth to be a portion where the frequency bands overlap with one another and which is available for use by all of eight states in total is a frequency bandwidth (management range shown in FIG. 7) that is used finally in the mobile phone. Therefore, if it is a design concept using all the eight states to adjust the frequency bandwidth, it is necessary to specify the narrowest frequency tolerance range in the states as a specification and to mass-produce the mobile phone.

However, the mobile devices, such as a mobile phone, may have a large initial variation range for every device (i.e., for every set) and have a considerably narrow frequency bandwidth which can secure performance, and there may be a mobile phone set which is difficult to adjust by the adjustment circuit 50. For this reason, in terms of a design and manufacturing, it is not easy to manage the resonance frequency range in a very narrow range.

Configuration of Third Embodiment

Figure 8:
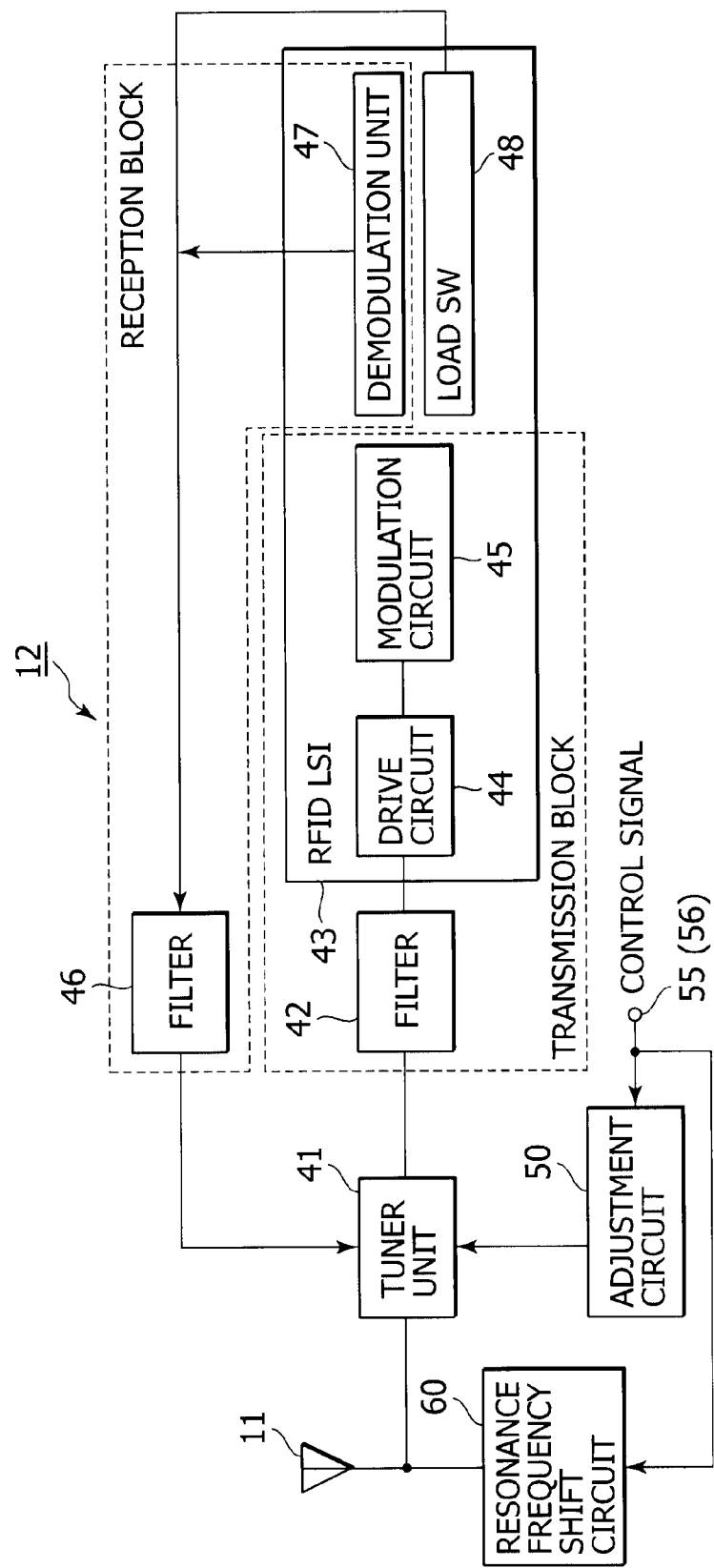
FIG. 8 is a block diagram of the non-contact wireless communication unit provided for the mobile phone in accordance with a third embodiment of the present invention.

The mobile phone of the third embodiment includes a resonance frequency shift circuit 60 which shifts the resonance frequency of the non-contact wireless communication antenna 11 toward the lower one together with the adjustment circuit 50 as shown in FIG. 8. The resonance frequency shift circuit 60 is subjected to the on/off control in accordance with the state of the adjustment circuit 50, thereby adjusting the resonance frequency of the non-contact wireless communication antenna 11 to the desired resonance frequency and to improve the communication characteristic. It is noted that, in the description of the third embodiment, the same reference characters are used for the same parts which show the same operation as that of the mobile phone of the first and second embodiments, and the detailed explanation will not be repeated.

Figure 9:
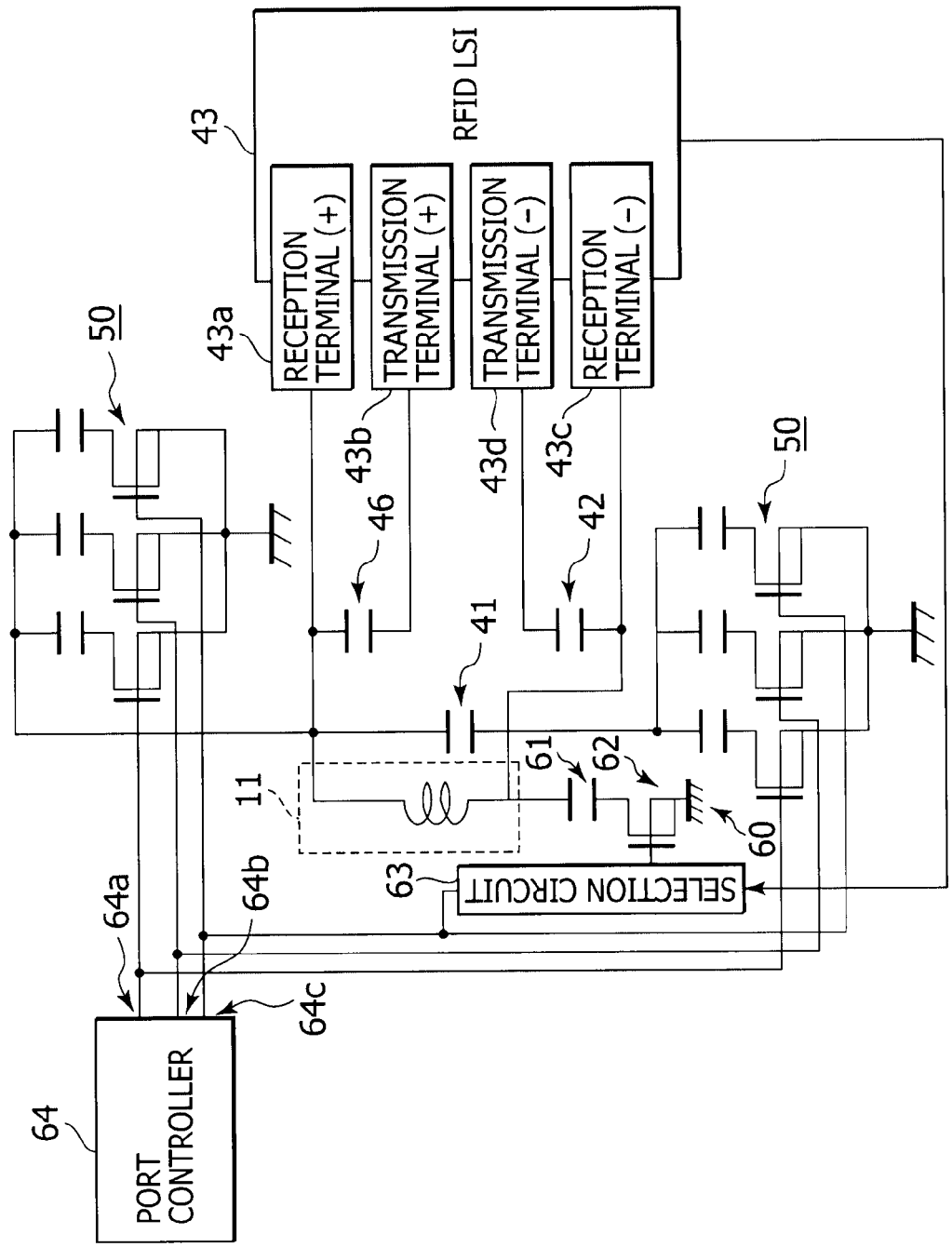
FIG. 9 is a circuit diagram of the principal part of the non-contact wireless communication unit provided for the mobile phone in accordance with the third embodiment.

FIG. 9 shows a block diagram of the principal part of the mobile phone of the third embodiment. As shown in FIG. 9, the principal part of the mobile phone of the third embodiment includes the adjustment circuits 50 provided for both the cathode side and the anode side of the resonance capacitor 41 to balance the excitation voltages of the non-contact wireless communication antenna 11, the resonance frequency shift circuit 60 including a capacitor 61 and FET 62 which are provided between the non-contact wireless communication antenna 11 and the ground, and a selection circuit 63 for performing the on/off control of the resonance frequency shift circuit 60 in accordance with the state of each adjustment circuit 50.

Each adjustment circuit 50 includes three capacitors and three FET which are each connected in series between one end of the resonance capacitor 41 and grounding, or between the other end of the resonance capacitor 41 and grounding. In addition, although it is an example, a capacitance ratio of three capacitors of each adjustment circuit 50 is set as a capacitance ratio of "1:2:3" so that the resonance capacitance of the resonance capacitor 41 may be changed linearly at the time of adjusting the resonance frequency.

The gate of the respective FETs of each adjustment circuit 50 is connected to any one of port terminals 64a, 64b, and 64c of the port controller 64 which is supplied with the 3-bit control signal from the control unit 14. In other words, it is configured that the port controller 64 is supplied with the 3-bit control signals of "000" through "111" from the control unit 14, the first port terminal 64a is a port which outputs the control signal of a least significant bit (LSB) of the 3-bit control signals, the second port terminal 64b is a port which outputs the second bit control signal of the 3-bit control signals, and the third port terminal 64c is a port which outputs a control signal of the most significant bit (MSB) of the 3-bit control signals. The respective port terminals 64a to 64c are connected to the gates of the respective FET of each adjustment circuit 50. Thus, the respective adjustment circuits 50 are controlled by the 3-bit control signal to be eight states in total. Accordingly, in the mobile phone of the third embodiment, the adjustment circuit 50 can adjust the resonance frequency of the non-contact wireless communication antenna 11 more finely than the mobile phone of the first embodiment and the second embodiment.

Figure 10:
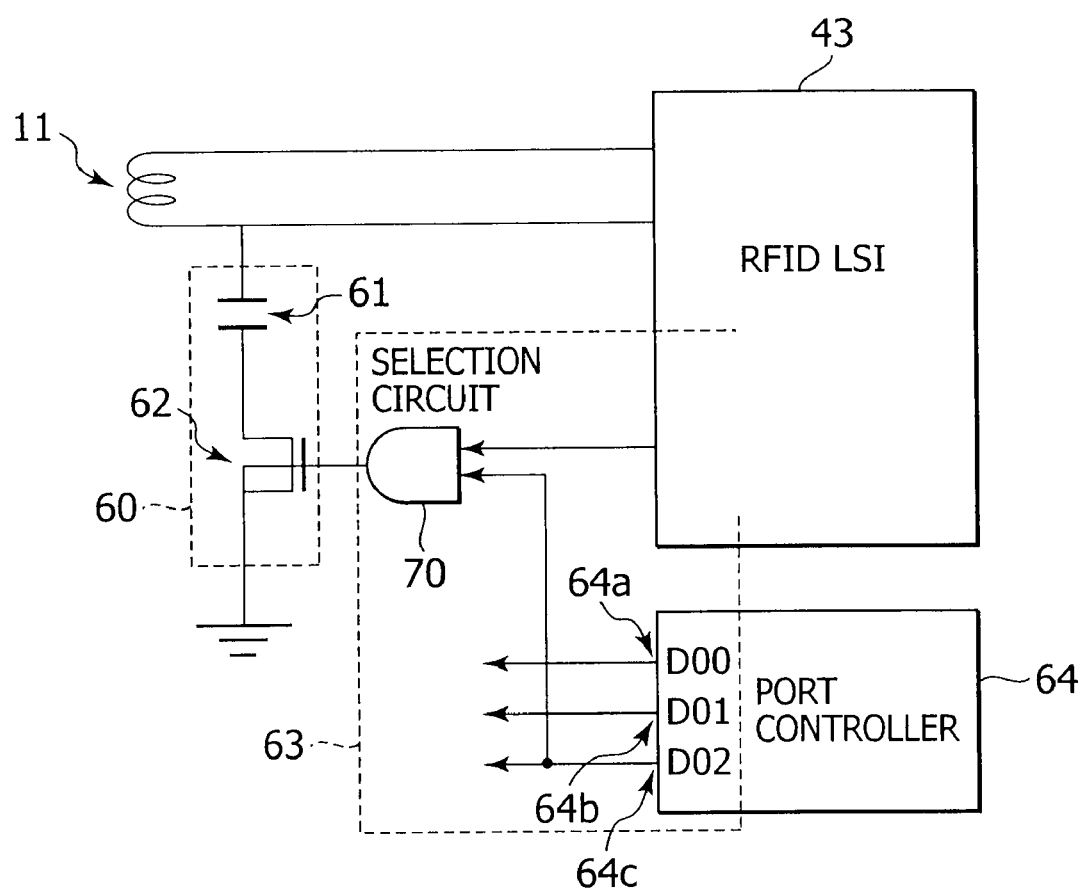
FIG. 10 is a circuit diagram of a resonance frequency shift circuit and a selection circuit of the non-contact wireless communication unit provided for the mobile phone in accordance with the third embodiment.

The selection circuit 63 includes an AND gate 70, as shown in FIG. 10. One input terminal of the AND gate 70 is connected to RFID LSI 43 so that a high-level signal is always supplied. Further, the other input terminal of AND gate 70 is connected to the third port terminal 64c, of the port controller 64, to which the control signal of the most significant bit is outputted. Furthermore, an output terminal of the AND gate 70 is connected to a gate of FET 62 of the resonance frequency shift circuit 60. Accordingly, the FET 62 of the resonance frequency shift circuit 60 is controlled to be turn on when the most significant bit of the control signal is at a high level.

Operation of Third Embodiment

FIG. 7 illustrates the management range of the resonance frequency for every state obtained by controlling each adjustment circuit 50 as shown in FIG. 9 with the 3-bit control signal without providing the resonance frequency shift circuit 60 and the selection circuit 63. It can be seen from FIG. 7 that an upper limit value of the resonance frequency decreases with increasing preset values (values of control signals of "000" through "111") of each adjustment circuit 50 and a lower limit of the resonance frequency increases with decreasing preset values of each adjustment circuit 50. The upper limit value of the resonance frequency is not determined by a communication distance but an incommunicable frequency generated in the vicinity thereof. Further, the communication distance determines a lower limit value. Thus, if the resonance frequency is adjusted only by each adjustment circuit 50, it is conceivable that the management range of the resonance frequency becomes narrower and difficult to adjust. It is assumed that the management range in this example is between "A MHz" and "B MHz".

Figure 11:
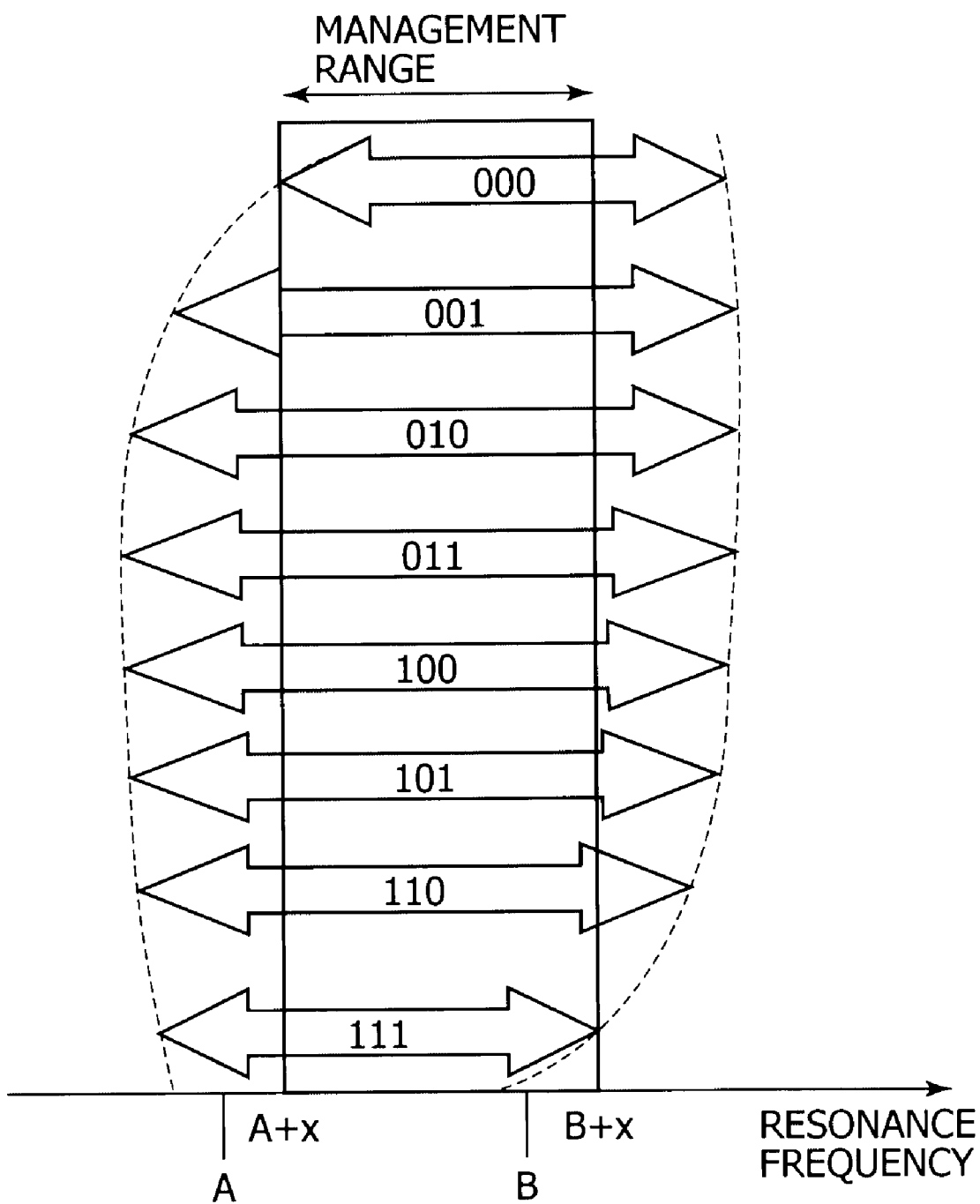
FIG. 11 is a chart showing the management range of the resonance frequency in the case where the resonance frequency is shifted by the resonance frequency shift circuit provided for the non-contact wireless communication unit.

Next, in order to extend the upper limit value of the resonance frequency, only the resonance frequency shift circuit 60 together with the respective adjustment circuits 50 is provided. In this case, the FET 62 of the resonance frequency shift circuit 60 is controlled to be turned on in conjunction with a predetermined trigger signal and antenna impedance is changed, to thereby shift the upper limit value and lower limit value of the resonance frequency for every state of each adjustment circuit 50 towards x kHz higher one. Accordingly, as shown in FIG. 11, the upper limit value of the resonance frequency which becomes lower in the case of a high preset value of each adjustment circuit 50 can be shifted to "B MHz+x kHz". At the same time, however, it is shifted to "A MHz+x kHz", to the lower limit value of the resonance frequency which becomes higher in the case of a low preset value of each adjustment circuit 50. Thus, the management range of the resonance frequency is not changed regardless of whether the resonance frequency shift circuit 60 is provided or not.

As such, in the mobile phone of the third embodiment in which both the resonance frequency shift circuit 60 and the selection circuit 63 are provided, the selection circuit 63 shown in FIG. 10 causes FET 62 of the resonance frequency shift circuit 60 to be in on-operation only during the period when the most significant bit is at a high level ("1") in 3-bit preset values of each adjustment circuit 50 as shown in FIG. 12. Accordingly, while the preset value of each adjustment circuit 50 is between "000" and "011", the resonance frequency shift circuit 60 is in off-operation. While the preset value of each adjustment circuit 50 is between "100" and "111", the resonance frequency shift circuit 60 is in on-operation.

Figure 13:
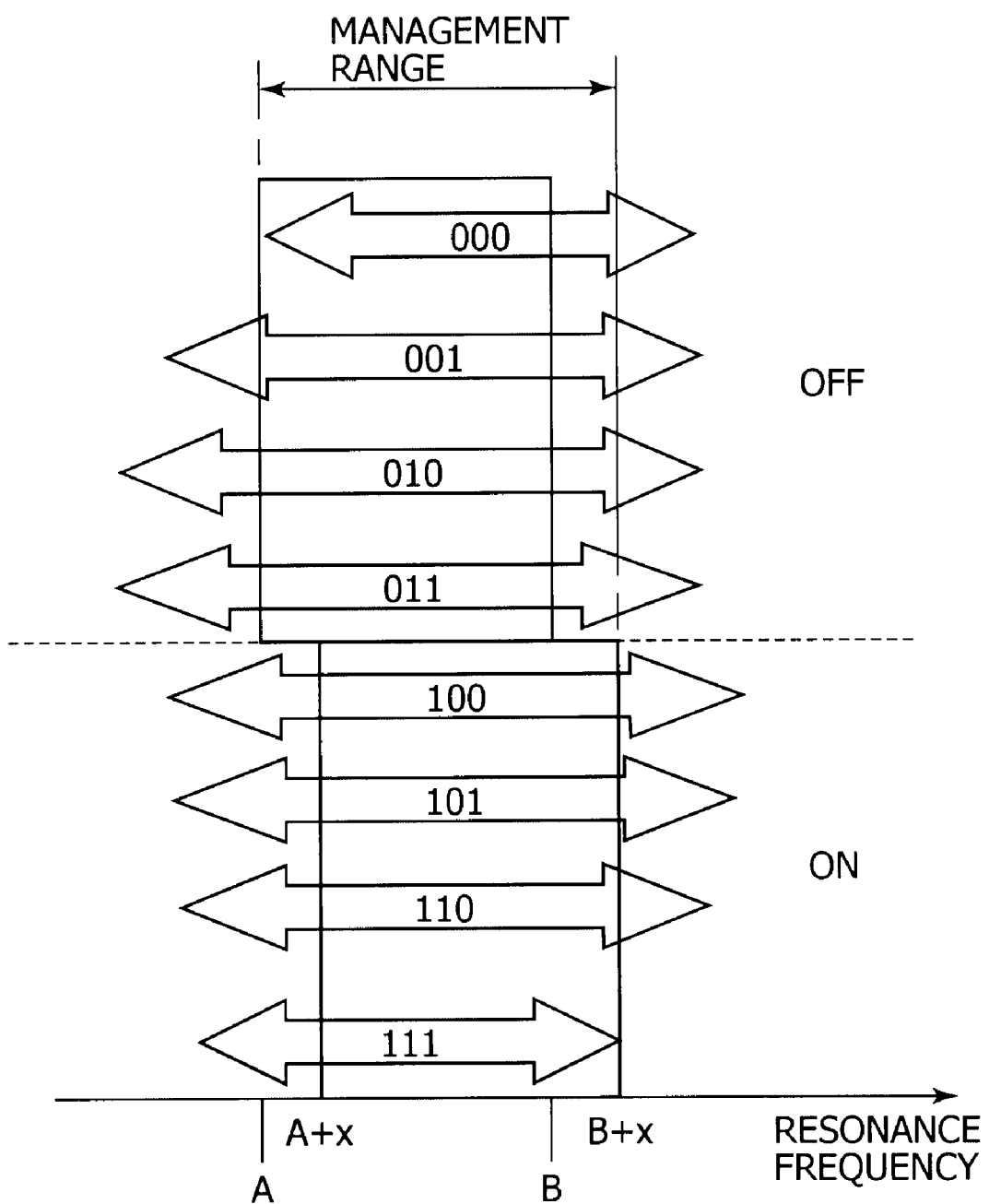
FIG. 13 is a chart showing the management range of the resonance frequency obtained by performing the on/off control of the resonance frequency shift circuit of the non-contact wireless communication unit provided for the mobile phone in accordance with the third embodiment.
Figure 14:
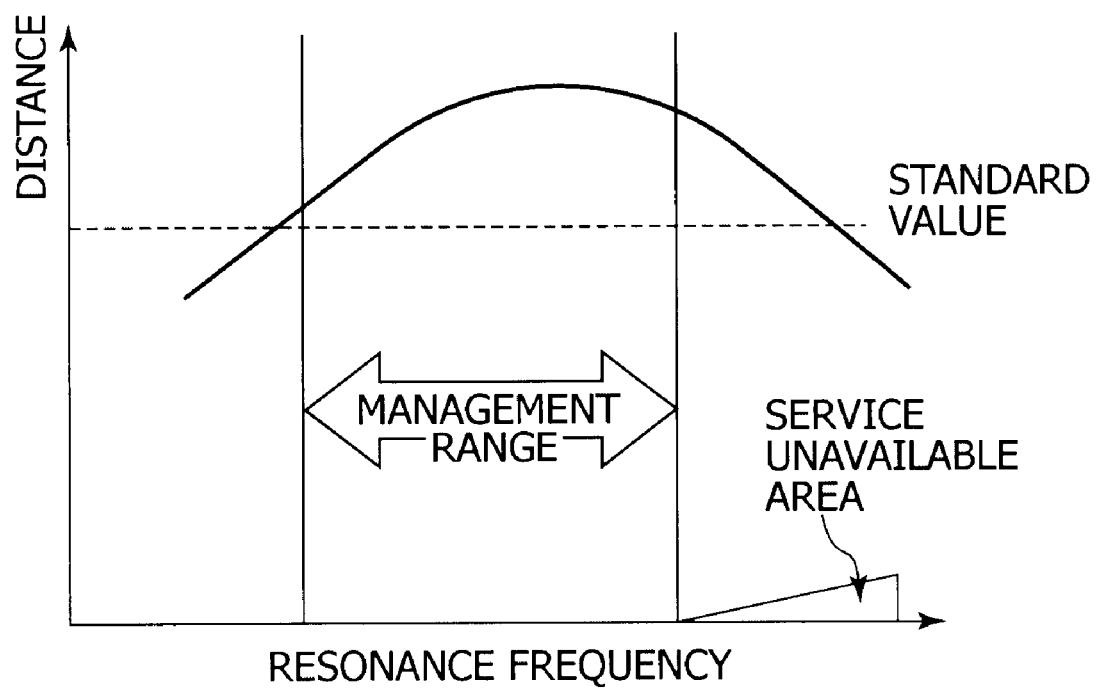
FIG. 14 is a graph for explaining the service unavailable area etc. which arises because the resonance frequency of the non-contact wireless communication antenna varies.

Thus, as shown in FIG. 13, while maintaining at "A MHz" the lower limit value of the resonance frequency in the case of a low preset value of each adjustment circuit 50, the upper limit value of the resonance frequency which becomes lower in the case of the high preset value of each adjustment circuit 50 can be raised to "B MHz+x kHz". Thus, the management range of the resonance frequency can be extended to "A MHz–B MHz+x kHz".

Advantage of Third Embodiment

As is clear from the above description, the mobile phone of the third embodiment includes the adjustment circuit 50 which adjusts the resonance frequency of the non-contact wireless communication antenna 11 to the desired resonance frequency by changing the resonance capacitance of the resonance capacitor 41 connected to the non-contact wireless communication antenna 11, as well as the resonance frequency shift circuit 60 which shifts this resonance frequency to the higher one, and the selection circuit 63 which performs on/off control of the resonance frequency shift circuit 60 according to the state of the adjustment circuit 50. The selection circuit 63 controls to turn off the resonance frequency shift circuit 60 when the preset value of the adjustment circuit 50 is low ("000" to "011"), and turns on the resonance frequency shift circuit 60 when the preset value of the adjustment circuit 50 is high ("100" to "111"). Accordingly, in a situation where the lower limit value of the resonance frequency, in the case of the low preset value of each adjustment circuit 50, is maintained as it is, the upper limit value of the resonance frequency which becomes lower, in the case of the high preset value of each adjustment circuit 50, can be raised, so that the management range of the resonance frequency can be extended.

Thus, the adjustment of the resonance frequency can easily be performed, and the good communication characteristics can also be obtained. Therefore, since the management range of the resonance frequency can be extended, it is possible to facilitate the design and manufacture of the mobile phone, and it is also possible to mass-produce the mobile phone by employing the wide frequency tolerance range as a specification. Besides, the same advantages as that of each embodiment as described above can be obtained.

Modification

In the above description of the embodiments, although the present invention is applied to the mobile phone provided with the non-contact wireless-communication function, the present invention may further be applied to the mobile devices, such as a PHS telephone (Personal Handyphone System) provided with the non-contact wireless-communication function, a PDA apparatus (Personal Digital Assistant), a handheld game machine, and a note-type personal computer apparatus. In any case, the same advantage as that described above can be obtained.

Lastly, it should be noted that the present invention is not limited to the above-described embodiments as disclosed by way of example, and it is naturally possible to modify the present invention variously according to a design etc., without departing from the technical scope in accordance with the present invention.

What is claimed is:

1. A non-contact wireless communication apparatus which receives a power supply from an external device by inductive coupling in a non-contact manner, to transmit/receive a signal with the external device, the non-contact wireless communication apparatus comprising:

a non-contact wireless communication antenna;

a resonance capacitor, connected in parallel with the non-contact wireless communication antenna, for obtaining a predetermined resonance frequency with the non-contact wireless communication antenna;

resonance frequency adjustment means for changing a resonance capacitance of the resonance capacitor to adjust the resonance frequency;

capacitance change amount control means for controlling an amount of change in resonance capacitance of the resonance capacitor in the resonance frequency adjustment means;

resonance frequency shift means for shifting the resonance frequency of the non-contact wireless communication antenna; and on/off control means for performing on/off control of the resonance frequency shift means in accordance with the amount of change in the resonance capacitance of the resonance capacitor by the capacitance change amount control means, wherein the resonance capacitor is connected in parallel with the non-contact wireless communication antenna and is connected in series to one end of each of a first capacitor and a second capacitor of an adjustment circuit, wherein the other end of the first capacitor is connected to a source of a first field effect transistor, and a drain of the first field effect transistor being grounded, and the other end of the second capacitor being connected to a source of a second field effect transistor, a drain of the second field effect transistor being grounded.

2. The non-contact wireless communication apparatus according to claim 1, wherein the resonance frequency shift means shifts the resonance frequency of the non-contact wireless communication antenna to a lower frequency by a predetermined frequency.

3. The non-contact wireless communication apparatus according to claim 2, wherein the resonance frequency adjustment means comprises: a capacitance adjustment capacitor connected in series with the resonance capacitor; and a connection control switch means for performing control of connecting and disconnecting the capacitance adjustment capacitor with the resonance capacitor.

4. The non-contact wireless communication apparatus according to claim 1, wherein the resonance frequency adjustment means comprises: a capacitance adjustment capacitor connected in series with the resonance capacitor; and a connection control switch means for performing control of connecting and disconnecting the capacitance adjustment capacitor with the resonance capacitor.

5. The non-contact wireless communication apparatus according to claim 4, wherein the resonance frequency adjustment means includes a plurality of the capacitance adjustment capacitors and a plurality of the connection control switch means, and control connection and disconnection of each of the capacitance adjustment capacitors with the resonance capacitor by performing on/off control for each connection control switch means to change the resonance capacitance of the resonance capacitor.

6. The non-contact wireless communication apparatus according to claim 5, wherein, by performing control of connection and disconnection of each of the capacitance adjustment capacitors with the respective connection control switch means, a capacitance of each capacitance adjustment capacitor of the resonance frequency adjustment means is set as a capacitance which allows a resonance capacitance of the resonance capacitor to change substantially linearly.

7. The non-contact wireless communication apparatus according to any one of claims 1 to 6, wherein the resonance frequency adjustment means are provided on an anode side and a cathode side of the resonance capacitor, respectively.

8. The non-contact wireless communication apparatus according to claim 1, wherein gates of the first and second field effect transistors are supplied with a control signal that performs the ON/OFF control.

9. A method of adjusting a resonance frequency of a non-contact wireless communication antenna in a non-contact wireless communication apparatus which receives a power supply from an external device by inductive coupling in a non-contact manner, to transmit/receive signals with the external device, the method comprising:

adjusting, by a resonance frequency adjustment means, the resonance frequency by changing a resonance capacitance of a resonance capacitor connected in parallel with a non-contact wireless communication antenna and for obtaining a predetermined resonance frequency with the non-contact wireless communication antenna; and on/off controlling, by an on/off control means, a resonance frequency shift means in accordance with an amount of change in the resonance capacitance of the resonance capacitor, wherein the resonance capacitor is connected in parallel with the non-contact wireless communication antenna and is connected in series to one end of each of a first capacitor and a second capacitor of an adjustment circuit, wherein the other end of the first capacitor is connected to a source of a first field effect transistor, and a drain of the first field effect transistor being grounded, and the other end of the second capacitor being connected to a source of a second field effect transistor, a drain of the second field effect transistor being grounded.

10. The non-contact wireless communication apparatus according to claim 9, wherein gates of the first and second field effect transistors are supplied with a control signal that performs the ON/OFF control.

11. A mobile terminal apparatus including non-contact wireless communication means which receives a power supply from an external device by inductive coupling in a non-contact manner, to transmit/receive signals with an external device, the non-contact wireless communication means comprising:

a non-contact wireless communication antenna;

a resonance capacitor, connected in parallel with the non-contact wireless communication antenna, for obtaining a predetermined resonance frequency with the non-contact wireless communication antenna;

resonance frequency adjustment means for changing a resonance capacitance of the resonance capacitor to adjust the resonance frequency;

capacitance variation control means for controlling resonance capacitance variation of the resonance capacitor in the resonance frequency adjustment means;

resonance frequency shift means for shifting the resonance frequency of the non-contact wireless communication antenna; and on/off control means for performing on/off control of the resonance frequency shift means in accordance with the variation of the resonance capacitance of the resonance capacitor by the capacitance variation control means, wherein the resonance capacitor is connected in parallel with the non-contact wireless communication antenna and is connected in series to one end of each of a first capacitor and a second capacitor of an adjustment circuit, wherein the other end of the first capacitor is connected to a source of a first field effect transistor, and a drain of the first field effect transistor being grounded, and the other end of the second capacitor being connected to a source of a second field effect transistor, a drain of the second field effect transistor being grounded.

12. The non-contact wireless communication apparatus according to claim 11, wherein gates of the first and second field effect transistors are supplied with a control signal that performs the ON/OFF control.

13. A non-contact wireless communication apparatus which receives a power supply from an external device by inductive coupling in a non-contact manner, to transmit/receive signals with an external device, the non-contact wireless communication apparatus comprising:

a non-contact wireless communication antenna;

a resonance capacitor, connected in parallel with the non-contact wireless communication antenna, for obtaining a predetermined resonance frequency with the non-contact wireless communication antenna;

a resonance frequency adjustment unit configured to change a resonance capacitance of the resonance capacitor to adjust the resonance frequency;

a capacitance change amount control unit configured to control a change in resonance capacitance of the resonance capacitor in the resonance frequency adjustment means;

a resonance frequency shift unit configured to shift the resonance frequency of the non-contact wireless communication antenna; and an on/off control unit configured to perform on/off control of the resonance frequency shift unit in accordance with the change of the resonance capacitance of the resonance capacitor by the capacitance change amount control unit, wherein the resonance capacitor is connected in parallel with the non-contact wireless communication antenna and is connected in series to one end of each of a first capacitor and a second capacitor of an adjustment circuit, wherein the other end of the first capacitor is connected to a source of a first field effect transistor, and a drain of the first field effect transistor being grounded, and the other end of the second capacitor being connected to a source of a second field effect transistor, a drain of the second field effect transistor being grounded.

14. A mobile terminal apparatus, comprising the non-contact wireless communication apparatus according to claim 13.

15. The non-contact wireless communication apparatus according to claim 13, wherein gates of the first and second field effect transistors are supplied with a control signal that performs the ON/OFF control.

* * * * *